(12) United States Patent
Mansi (10) Patent No.: US 9,460,639 B2
(45) Date of Patent: Oct. 4, 2016

(54) TRAINING SIMULATOR FOR MECHANICAL VENTILATION

(71) Applicant: University of Dammam, Dammam (SA)

(72) Inventor: Ahmed Abdelkarim Mansi, Al Khobar (SA)

(73) Assignee: University of Dammam, Dammam (SA)

( * ) Notice: Subject to any disclaimer, the term of this patent is extended or adjusted under 35 U.S.C. 154(b) by 196 days.

(21) Appl. No.: 14/482,813

(22) Filed: Sep. 10, 2014

(65) Prior Publication Data

US 2015/0079567 A1 Mar. 19, 2015

(51) Int. Cl.
*G09B 23/28* (2006.01)
(52) U.S. Cl.
CPC .................... *G09B 23/288* (2013.01)
(58) Field of Classification Search
USPC ................ 434/262, 265, 267, 268, 270, 272
See application file for complete search history.

(56) References Cited

U.S. PATENT DOCUMENTS 6,588,423 B1    7/2003   Sinderby

OTHER PUBLICATIONS

"Ventilation Servo-I With NAVA Neurally Controlled Ventilation", Maquet Critical Care AB, Solna, Sweden, 2007, 14 Pages.
"Servo Education NAVA Study Guide", Maquet Critical Care AB, Solna, Sweden, 2008, 52 Pages.

*Primary Examiner* — Kurt Fernstrom
(74) *Attorney, Agent, or Firm* — Oblon, McClelland, Maier & Neustadt, L.L.P (57) ABSTRACT

A diaphragm respiratory signal simulator is activated by skin voltage that is coupled to the simulator by many ways such as but not limited to a user sliding a finger over a conductive surface, the user sliding a finger over surfaces close to the conductive element, touch or sliding the finger over the ventilator screen. The conductive surface is electrically connected to a ring electrode at a distal part of a manikin's esophagus. The diaphragm respiratory signal simulator produces a synthetic diaphragm electrical signal that triggers a ventilator to deliver a supported breath, which is proportional to the strength of the generated signal. This process allows safe and successful training on the operations of NAVA mode of ventilation and catheter positioning.

20 Claims, 12 Drawing Sheets

Fig. 11

TRAINING SIMULATOR FOR MECHANICAL VENTILATION

CROSS REFERENCE TO RELATED APPLICATION

The present application claims priority to GB patent application 1316385.2, filed Sep. 15, 2013, the entire contents of which being incorporated herein by reference.

TECHNICAL BACKGROUND

The "background" description provided herein is for the purpose of generally presenting the context of the disclosure. Work of the presently named inventor, to the extent it is described in this background section, as well as aspects of the description that may not otherwise qualify as prior art at the time of filing, are neither expressly or impliedly admitted as prior art against the present invention.

An improved mode of ventilation that uses the electrical activity of the diaphragm (AEdi, or more simply Edi) has been introduced to clinical practice. As an example, NAVA (Neurally Adjusted Ventilatory Assist) is a mode of mechanical ventilation that delivers assistance in proportion to, and in synchronization with, a patient's respiratory efforts, as evidenced by an electrical signal generated within the respiratory center in the medulla and transmitted through the phrenic nerves to the diaphragm. NAVA uses a catheter inserted into a patient's/volunteer's mouth/nose, down their esophagus, and to the stomach. The electrodes array catheter detects electrical activity (AEdi) of the diaphragm and transmits it to the ventilator, which in turn delivers a supported breath to the patient.

AEdi, or the electrical activity of the diaphragm, is a result of stimulating the respiratory center in the patient's brain. Accordingly, as is generally accepted in the industry it can only be found in a human volunteer; manikins, such as CPR manikins, do not have a brain that functions like the human brain to generate this signal nor are they equipped with an electrical subsystem that mimics the respiratory electrical activity of a human body. As a consequence, a human volunteer is needed in the case of training personnel on the operations of NAVA mode of mechanical ventilation, especially catheter positioning. As recognized by the present inventor, soliciting the support of a volunteer for training and demonstration is often difficult because the catheter insertion in the volunteer's mouth/nose is uncomfortable and can result in subjecting the healthy human volunteer to risk of agitation, injury, vomiting and aspiration. In addition, training on patients is usually unethical and often more limited than desired, especially in the case of infants, where a parent or guardian rarely grants permission for their infant to be used as a "training subject" to support health care professionals on NAVA training.

SUMMARY

The present disclosure relates to a diaphragm respiratory signal simulator that is activated by skin voltage created by sliding a fingertip or finger on a conductive surface. The conductive surface is electrically connected such as by a wire to a ring electrode positioned at the distal part of a manikin's esophagus so as to excite a NAVA catheter. The diaphragm respiratory signal simulator produces a synthetic diaphragm electrical signal that triggers a ventilator to deliver a supported breath, which is proportional to the strength of the generated signal. This process allows safe, successful training on NAVA mode of mechanical ventilation and catheter positioning, without the need for a human volunteer.

Conventional modes of ventilation do not take the electrical activity of the diaphragm into consideration, and thus there is no need or interest in creating a simulated respiratory signal. However, in light of the above-described limitations with conventional mechanical ventilators, the present disclosure addresses a facilitated training process that allows training on manikins, by generating a synthetic electrical signal that mimics an AEdi that is naturally occurring in the diaphragm of a human body.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The following description relates to a mode of ventilation, such as a NAVA in Servo i ventilator, that is used with an external signal, as opposed to a naturally occurring Edi signal inside a living patient, so that training may be performed on a manikin. Moreover, mechanical ventilators are used to sustain human life when natural breathing is compromised or there are other respiratory issues with a patient. One of the issues with the NAVA mode ventilation training of medical professionals is that the training can be limited due to the need for human volunteers. However, as recognized by the present inventor, a simulator that applies an electrical signal that mimics Edi, so it can be used in demonstrations and training on NAVA mode, and serves, in a manikin, as a substitute for the respiratory center in the human brain and the electrical activity in the human diaphragm.

As will be discussed later in reference to FIG. 2, NAVA mode ventilation uses a catheter with an electrode array disposed in a patient's esophagus and stomach. The respiratory center of the patient generates an electrical signal that is detected by an electrode array on the catheter, and triggers a ventilator to provide support to the patient's breathe. The electrical activity at the base of the human esophagus (AEdi) provides a synchronization signal that is used with a NAVA ventilation system so as to trigger respirator cycles in the patient's lungs. For training purposes, however, as recognized by the present inventor, training on a NAVA ventilation system can be limited because it is physically uncomfortable to have the catheter disposed in the-volunteer nose/mouth.

The present inventor recognized the value of providing an external stimulus that provides a waveform similar to that would be generated in the diaphragm of a human body, at the level of the Cardia (entrance to the stomach) in the human esophagus.

Figures 1A, 1B, 1C:
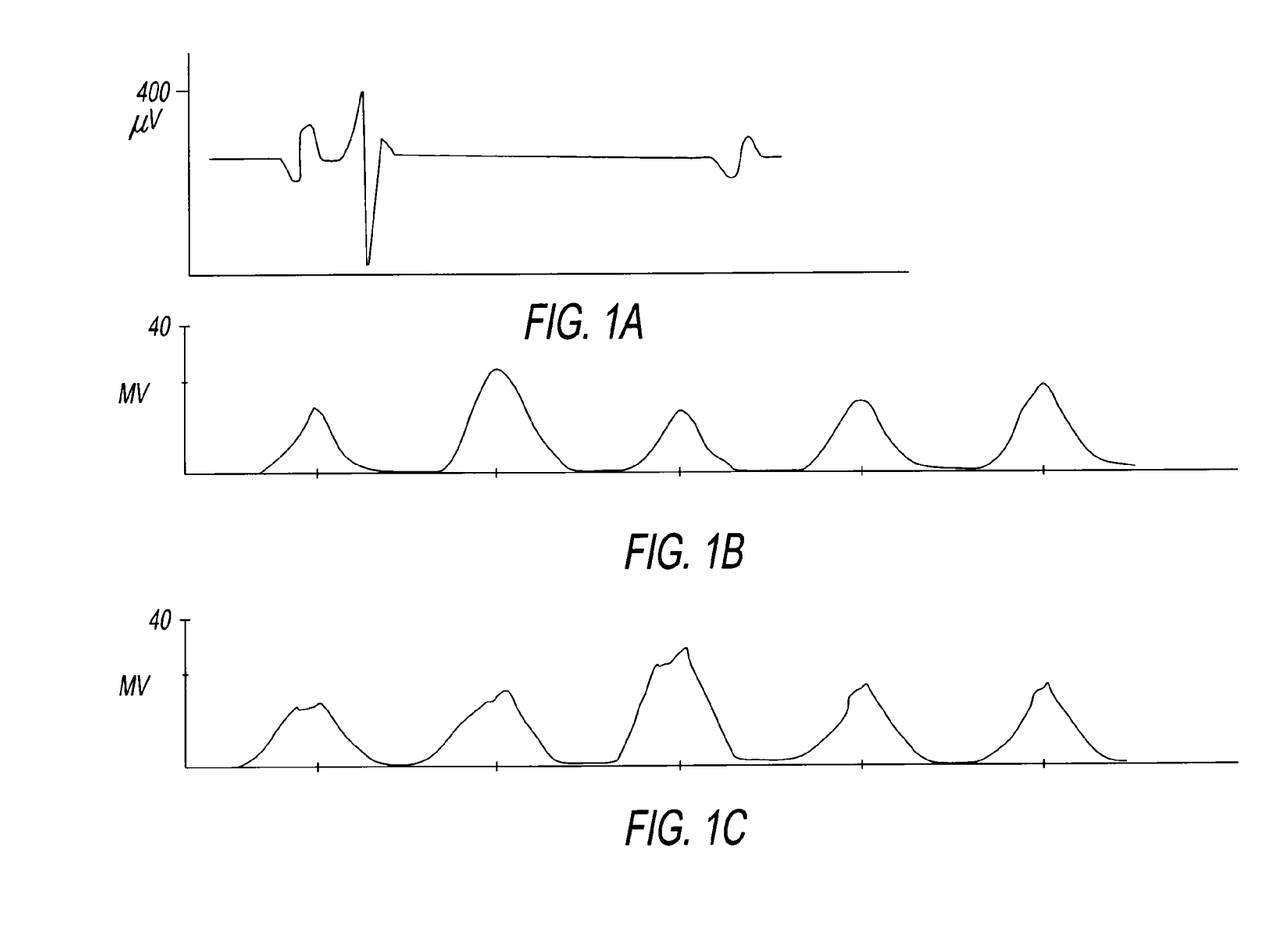
FIG. 1A is an example waveform of the electrical signal generated by the human heart according to one example.
FIG. 1B is an example waveform of an Edi signal naturally occurring in a human.
FIG. 1C is an example waveform of an electrical signal originating from a skin voltage of a human operator of a NAVA ventilation system and coupled to a diaphragm respiratory signal simulator according to one embodiment.

Referring to FIG. 1A, an electrical signal generated from the human heart is shown in a voltage ($\mu V*10$) vs. time waveform. As can be seen the shape of the waveform has a characteristic peak. Because only a single heart beat is shown, the waveform includes just one characteristic peak. For comparison purposes, FIG. 1B shows a real electrical waveform (Edi) generated in a human's respiratory center to the diaphragm, near the opening to the stomach that is used to contract the diaphragm in the human respiratory process. The waveform of FIG. 1B includes plural peaks per heartbeat, with peaks varying between 15 and 30 $\mu V$ in this example.

As can be seen by a visual comparison of FIGS. 1A and 1B, the heart's waveform has a different shape (e.g., signature), periodicity, and pulse width. In this context, an EKG signal is filtered by the NAVA software from the respiratory Edi signal, and so EKG signals have no practical importance in triggering a breath in NAVA ventilation system, rather it is used to ensure the correct position of the catheter.

However, the present inventor recognized that the electrical signal present on an exterior skin of a human hand, a "skin voltage", can be remarkably modulated to be similar to that of the electrical signal generated in the human diaphragm. FIG. 1C is an example waveform of the skin voltage as recorded from a finger of a human, and when compared with the waveform of FIG. 1B shows a remarkably similar waveform signature. Based on this observation, the present inventor recognized that a device that could effectively couple the skin voltage to the electrodes in the catheter of a NAVA mode would be a suitable proxy for the AEdi generated by the human body. Moreover, the skin voltage may be used within a manikin to replicate the naturally occurring voltage in a diaphragm that triggers the human respiratory response in the NAVA mode so that the medical professional receiving the training on the ventilator can be the only person needed to perform the training. Moreover, a third party volunteer is not needed in a training session because a manikin can serve as the "mechanical proxy" for a patient and the skin voltage of the medical professional or the operator can be the "electrical proxy" for the patient.

Figure 2:
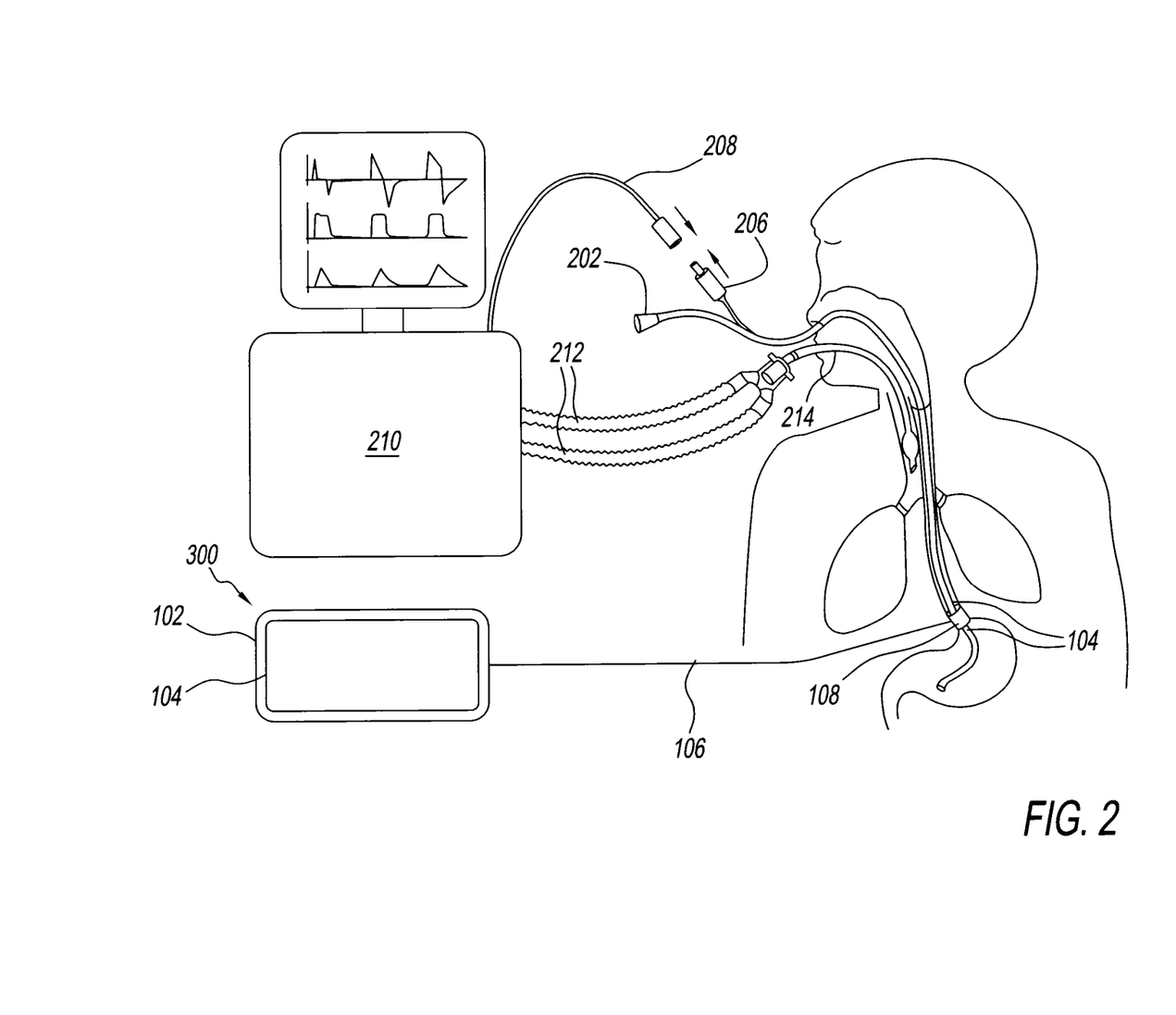
FIG. 2 is a schematic of a diaphragm respiratory signal simulator connected to a manikin's esophagus by a ring electrode according to one embodiment.
Figure 3:
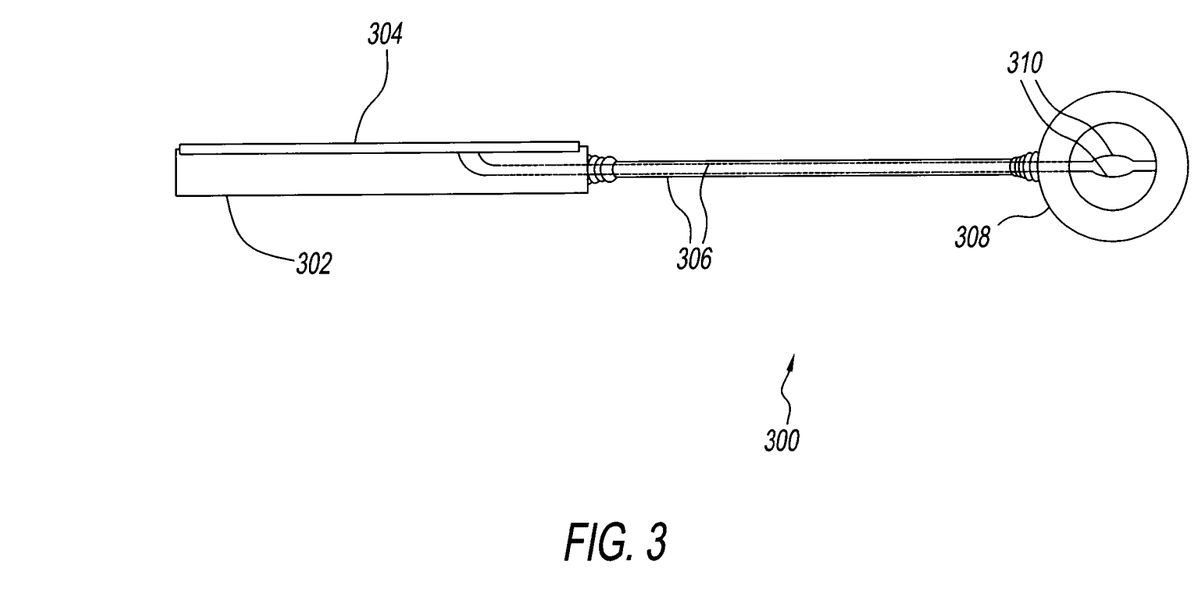
FIG. 3 a schematic of a diaphragm respiratory signal simulator according to an embodiment.

Based on this observation, and referring to FIG. 2, the present inventor identified that an external signal actuator 102 may be used to generate an external signal using a naturally occurring skin voltage from an operator, so as to simulate a naturally occurring electrical signal in diaphragm of a human and thus excite the electrode array on the catheter. FIG. 2 is a schematic of a diaphragm respiratory signal simulator 300 connected to a manikin's esophagus 9 by a ring electrode 4 according to one example. FIG. 2 also shows the ventilator 210 with NAVA option connected to the same manikin. A catheter 202 includes an electrode array 204 on one end is inserted through the manikin's nose/mouth down to its stomach; such that the electrode array end goes through the electrode ring 108 (that was previously positioned at a distal part of the esophagus of the manikin), passing through its conductive plates 310 (FIG. 3).

Furthermore, upon the manual and/or automatic generation of the synthetic AEdi by the signal actuator 102, the signal is conducted through the wire 106, to the ring electrode 108. Once the signal is received at the ring electrode 108, the electrode array 204 detects the signal and conducts the signal through a catheter adapter 206 to the ventilator 210 via a special cable 208. As a response, the ventilator 210 starts supporting the breathing of the manikin through a breathing circuit 212 that is connected on one end to the ventilator 210, and on the other end to a tube disposed through the patient's mouth and into the trachea of the patient. Consequently, the ventilator 210 is triggered, gas is delivered through the breathing circuit 212 into the lungs 12 of the patient/simulator by way of the endotracheal tube 214. The catheter 202 is used as an electro-mechanical mechanism for positioning the sensor array 104 in the esophagus 9 of the patient/simulator. Details of the NAVA ventilator are described in "Servo Education NAVA Study Guide", English Version 1.6, by MAQUET Critical Care AB, 2008, Order Number 6675367, the entire contents of which being incorporated herein by reference.

However, unlike conventional NAVA mode operation, where the catheter 202 and endotracheal tube 214 are disposed in a human patient, they are disposed in a manikin in the present embodiment. Along with the manikin, a diaphragm respiratory signal simulator 300 is also used to produce a simulated Edi signal to excite the sensor array 104. A signal actuator 102 is connected via a wire 106 (or other conductor such as a plate, bus, or even digital communication channel with a Digital to analog converter on one end, and an analog to digital converter on the other end) and conductive plates 310 (shown in FIG. 3) to a ring electrode 108 disposed around the electrode array at the top of the stomach.

Regarding coupling efficiency, for a rougher surface of the signal actuator 102 (e.g., in a range of between 50 grit to 200 grit sandpaper) a greater sweeping pressure (between 0.25 to 1 lb/in$^2$) with faster finger sweeping speed (1" to 3" of translator motion per 0.5 sec) will result in a higher Edi signal (e.g., over 25 $\mu V$ to 100 $\mu V$, as opposed to less than 25 $\mu V$), while for smooth or polished surface a slight sweeping pressure (0.05 to 0.25 lb/in$^2$) over a similar speed will result in a signal with a larger amplitude (e.g., over 25 µV to 100 µV), as opposed to lower amplitude signals (e.g., 25 µV or under).

The conductive plate 104 disposed on the signal actuator 102 is a generally planar, metallic structure, that allows a user to place his or her finger on the conductive plate 104 and rub the conductive plate 104 in a linear motion so as to couple the skin voltage from the user via the wire 106 to the ring electrode 108. Moreover, a simulated electric signal that triggers the electrode array 104 is generated by the human touch on the conductive plate 104, recognizing that the skin voltage has a waveform similar to that of the Edi signal waveform.

FIG. 3 is a schematic of a diaphragm respiratory signal simulator 300 according to one example. The diaphragm respiratory signal simulator 300 has a signal actuator unit (conductive plate holder) 302 that is used to generate a signal based on a manual activation in this embodiment. The manual activation is generated with a rubbing of one or more fingers on a conductive surface 304 of the signal actuator 302. It has been observed that this rubbing of a finger on the conductive surface 304 couples the skin voltage on the finger to the surface 304. The wire 306 conducts the coupled skin voltage to a ring electrode 308 that includes conductive plates 310. The conductive plates 310 that are electrically connected to the ring electrode 308, such as via a conductive wire. The ring electrode 308 is disposed inside the manikin so that the catheter of the ventilator can be disposed therethrough.

In one embodiment, the conductive surface 304 is a conductive sheet suitably exposed to enable a fingertip (or an entire finger, or part of a finger, as well as plural fingers or portions of plural fingers) slide on the conductive surface 304. In other embodiments (as will be discussed in FIGS. 5 and 10), the conductive surface 304 may include of a conductive element wire net that is sandwiched between two pieces of plastic, wherein the predetermined triggering actions include: a fingertip slide onto the conductive element wire net (conductive surface 304), a fingertip slide onto a metal and/or plastic rough surfaces that are within a nearby region of the conductive surface 304, and waving the palm of the hand in a range of 3-10 cm above the conductive surface 304 (without any contact), actuating the conductive wire net to detect any change in the electric field of its surroundings by acting like a receiving antenna, or capacitive coupling. The strength of the generated signal in both embodiments relates to the pressure, contact area (in an inclusive range between 0.25 in$^2$, and 3 in$^2$), the duration and the distance of the predetermined triggering action, as well as the roughness of the surface used to generate the signal, all of which were discussed above.

Automatic activation of the signal actuator unit 302 is performed by connecting the actuator unit 302 to a computer and generating an electrical signal via software running on computer hardware as will be discussed in more details with respect to FIG. 8. This signal is based on inputting specific parameters such as but not limited to signal's amplitude, pulse width, and peak shape (e.g., rounded or "peaky"). This feature will allow the user to train on a more accurate and consistent signal as the strength of the signal will be constant throughout the duration of the training. This feature also provides better training for different breathing patterns (e.g., depth and periodicity of the breathing cycle) that may reflect different simulated conditions (infant, adolescent or adult with varying degrees of respiratory issues).

The ring electrode 308 may be of different sizes depending on the size of the manikin's esophagus, although typically in a range of 0.25" in diameter to 1" in diameter. The conductive surface 304 may be made from but not limited to copper, aluminum or any other suitable conducting element, and either solid or mesh material.

The diaphragm respiratory signal simulator 300 shown in FIG. 3 is a passive device. Moreover, the conductive surface 2 is disposed on a dielectric body through which the wire 306 is disposed and connected to the conductive plates 310 that connect to the ring electrode 308. The catheter 202 with the electrode array 104 fits within the ring electrode 108 so that a good electrical coupling may occur between the ring electrode 308 and the electrode array 104 (FIG. 2).

In operation, the medical professional, who is receiving training, moves his or her finger across the conductive surface 308 in a dynamic motion. The present inventor observed that if the user maintains a static position on the conductive plate 304 it tends to result in a feeble signal (10 µV peak signal or less). On the other hand, due to the dynamic rubbing action on the conductive surface 304, a larger electrical signal with a higher amplitude is observed.

Although the simulator of the present embodiment is passive (no active electrical components), the diaphragm respiratory signal simulator 300 may also have a variable gain amplifier connected between the conductive surface and the wire 306 so as to add gain to the electric signal to boost the signal between 5 microvolt and 120 microvolt (peak). The amplifier may also have a feedback loop that provides automatic gain control to keep the electrical signal within a user specified sub-range range of the system's dynamic range of 5 microvolt to 120 microvolt. As an example, a more narrow range may be specified by a user, such as depending on the training exercise, somewhere between 20 and 30 microvolts for example, which would simulate an individual with a distressed respiratory condition.

The size of the conductive plate 304 is between 2-5 inches in a first dimension, and between 5 and 8 inches in another dimension of the plate. These lengths, as well as the rectangular shape are exemplary, as the size/area/shape of the plate needs to be sufficiently large to allow for rubbing one to three segments of a finger (or other body part, such as palm). This provides sufficient room for human touch of all or part of a finger, and a swiping motion over multiple finger-wipes. The conductive plate 304 is mounted on the conductive plate holder 302 which is made of an electrically-insulating or dielectric material. The conductive plate 310 and ring electrode 308 are conductive metal such as aluminum, copper or steel for example. The conductive wire 306 is disposed in a rigid conduit that is nonconductive so to prevent shunting of the electrical signal carried thereon.

Figure 4A:
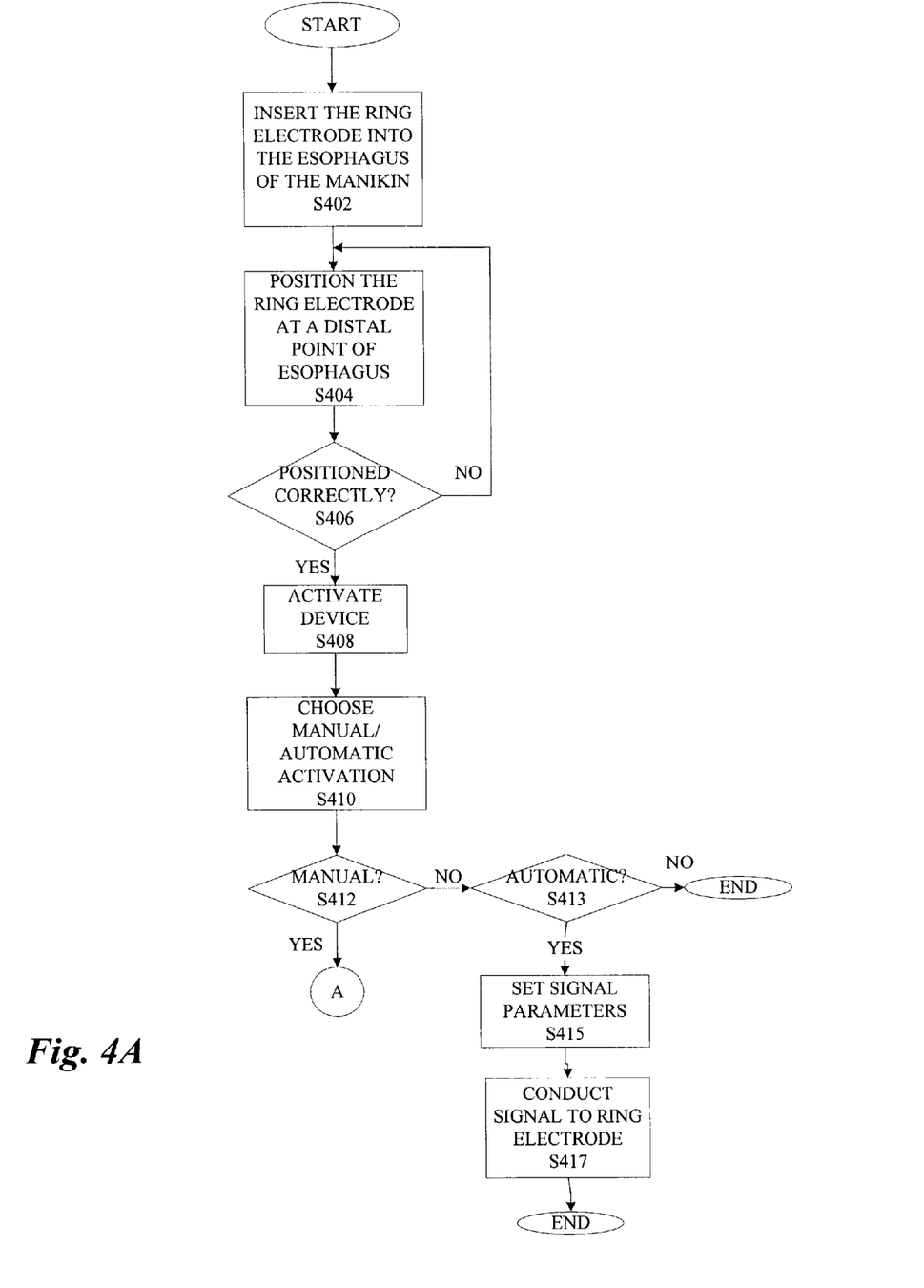
FIGS. 4A and 4B are flowcharts illustrating a process of generating an Edi electrical signal according to an embodiment.

FIG. 4 is a flowchart illustrating a process of generating an electrical signal according to one example. The process begins at step S402 where the user attaches the ring electrode into the esophagus of the manikin. Then, at step S404 the user inserts the catheter to a calculated (or predetermined) insertion distance at a distal part of the esophagus through the ring electrode. The process then proceeds to step S406 where the user checks if the catheter is positioned correctly. If it is not then the process returns to step S404 where the user will have to fix the positioning of the ring electrode. However, if the catheter is positioned correctly at step S406, the process proceeds to step S408 where the user activates the diaphragm respiratory signal simulator.

Figure 4B:
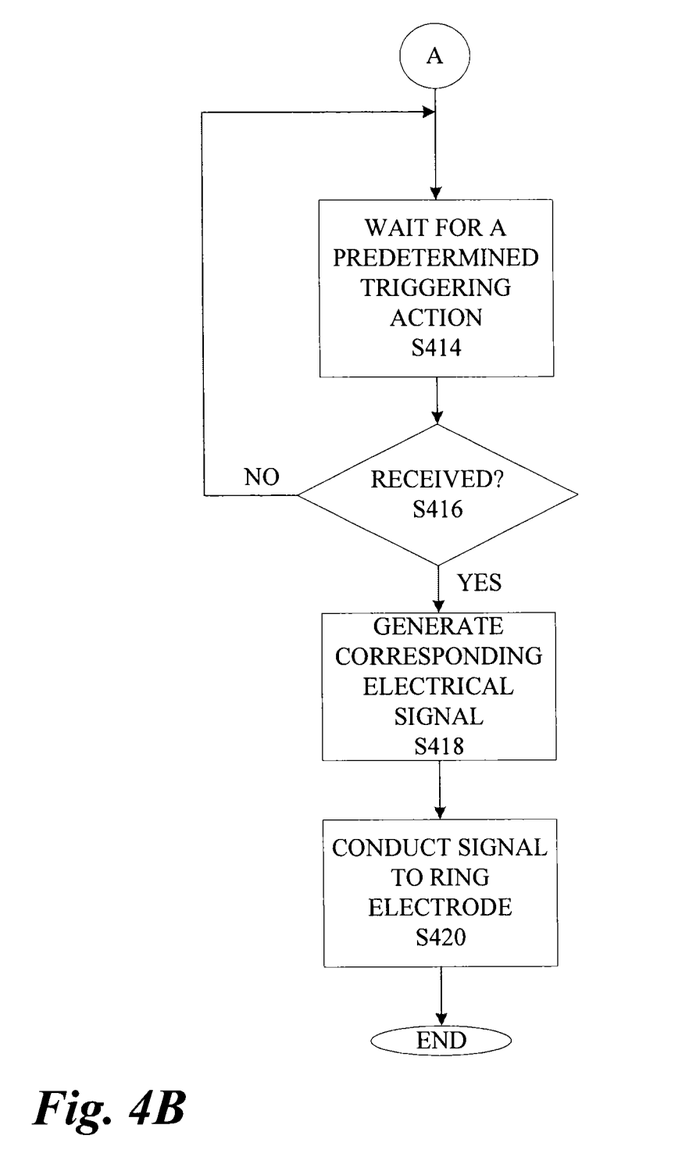

At step S410, the user chooses either an automatic or a manual mode of operation, and the process proceeds to step S412 where the user checks if the device is set to manual mode, if yes the process proceeds to step S414. However, if not, the process proceeds to step S413, where the user checks if the device is set to automatic mode, if not then the process terminates. Furthermore, if it is, the process proceeds to step S415 where the user sets the desired signal's parameters. Then, at step S417, the device conducts the generated signal to the ring electrode and the process terminates.

In another embodiment, a manual mode may be set at step S412. If so, the process proceeds to step S414, which is a waiting state until the device receives a predetermined triggering action, the process then proceeds to step S416, where the device checks if a predetermined triggering action was received. If it has not the process returns to step S414. However, if a predetermined triggering action was received, the process proceeds to step S418, where the device generates a corresponding electrical signal. At step S420, the device conducts the generated signal to the ring electrode and terminates the process.

Figure 5:
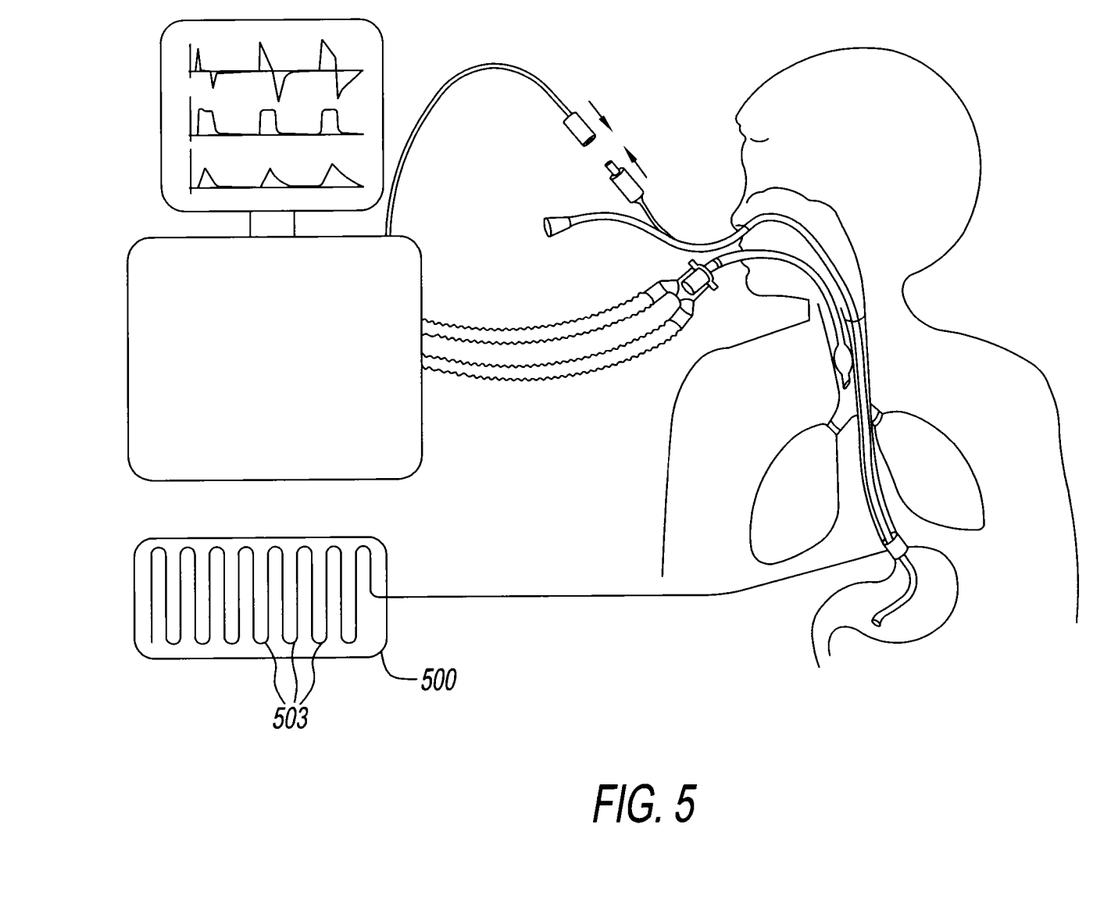
FIG. 5 is a schematic of another embodiment of the diaphragm respiratory signal simulator connected to a manikin's esophagus by a ring electrode.

FIG. 5 is similar to the system description of FIG. 2, although describes another embodiment of the diaphragm respiratory signal simulator. In particular, instead of the signal actuator 302 with conductive surface 304 from FIG. 3, the signal simulator 500, has a copper wire (e.g. between 10 and 30 gauge disposed in a serpentine pattern on a dielectric substrate). A relatively thin (0.2-0.4 mm) nonconductive film (e.g. plastic) is disposed over top of the serpentine wire 503. The serpentine wire is wound in a planar, sinuous pattern with a pitch between turns at between 0.05" to 1". In operation, when the user moves his or her finger over top of the film on the wire 503 so that the skin voltage is induced into the wire 503 and conducted to the ring electrode 108 so as to trigger breath in NAVA ventilation. In addition triggering can be done remotely by rubbing the finger on a rough plastic plate that is held by the operator 20 to 150 cm away from the conductive unit, in this case the signal amplitude decreases with distance.

Figure 6:
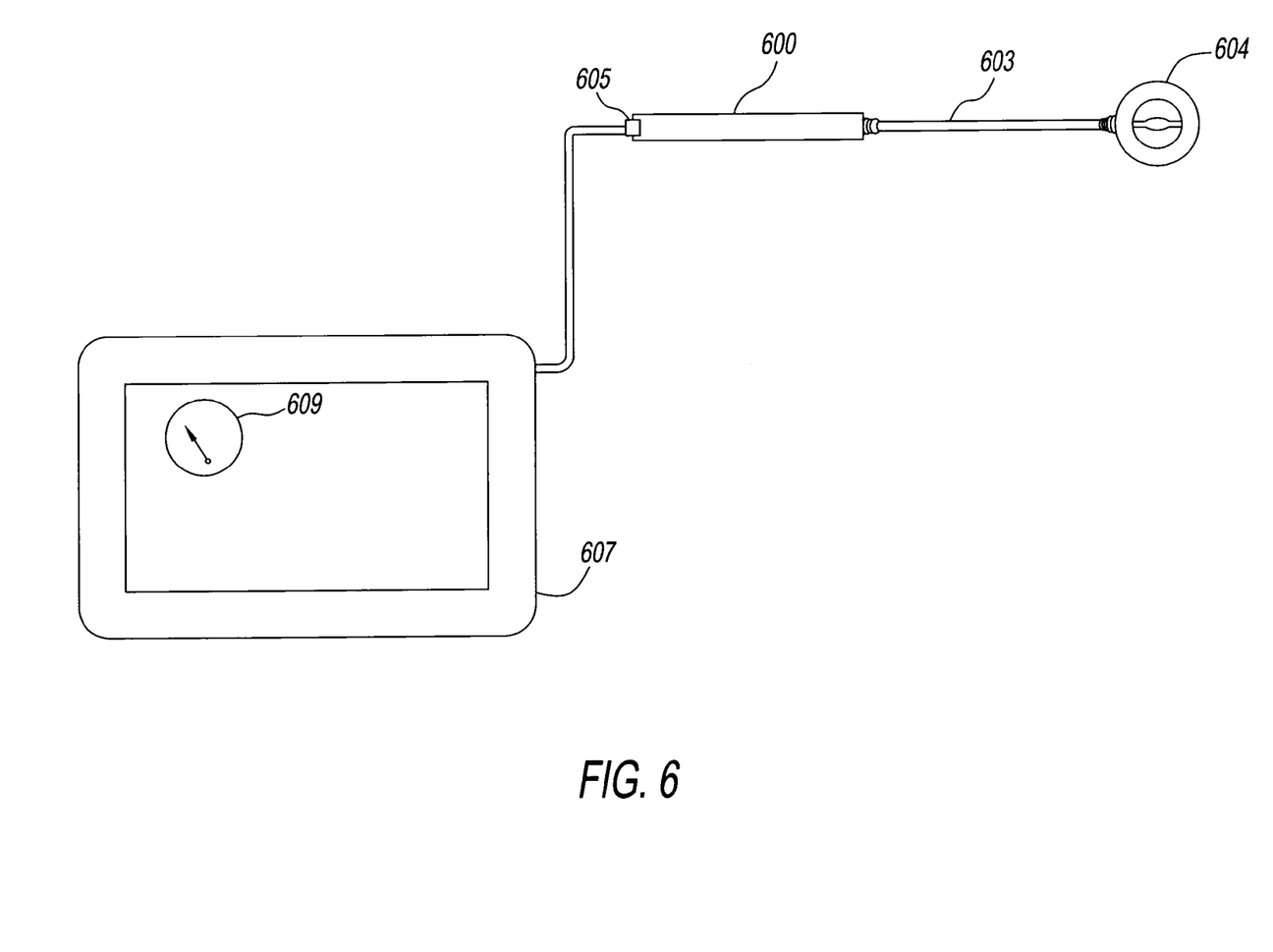
FIG. 6 is a schematic of the diaphragm respiratory signal simulator connected to a smart device according to an embodiment.

FIG. 6 shows a diaphragm respiratory signal simulator 300 (or 500 of the embodiments of FIGS. 3 and 5), with an interface 605 attached to a main body 600. The conduit 603 and ring adapter 604 are coupled to the main body 600 as shown. However, the I/O 605 provides an electrical interface that is connected either to the conductive plate 304, directly or indirectly via an amplifier, or to the serpentine wire 503 of the embodiment of FIG. 5. The I/O 605 provides the signal to a connected computing device 607, which may be a tablet computer, for example, running a downloaded application. As shown, the tablet computer 607 has an application that provides a graphical user interface indicating a signal strength 609 so as to provide the operator with feedback regarding how well a signal is being coupled into the diagram respiratory signal simulator. As an example, when an operator rubs on the conductive surface 304 of the embodiment of FIG. 3, and it is a rapid short term rubbing action (less than 3 seconds in duration for less than 4" of transversal contact), a processor in the tablet computer, compares (e.g., correlation) the waveform observed with the predetermined waveform and provides an indication that such a signal provides a "weak" simulation signal (e.g., with a correlation coefficient between 0.1 and 0.25). On the other hand, a signal strength needle as part of the gauge 609, moves to "strong" (e.g., correlation coefficient of 0.75 to 1), when the user rubs in a more consistent long term pattern (1" to 3" of traversal movement per second for at least 2 seconds, e.g., 2 to 10 seconds) on the conductive plate 304. In this manner, through the tablet computer 607 and the graphical user interface, a user is provided with visual feedback (an audio feedback signal may also be generated to inform the user) regarding the user's interaction with the diaphragm respiratory signal simulator and the simulated Edi signal being produced as a result of the user's interaction.

Moreover, the visual indication from the gauge 609 provides a visual clue to the user, regarding whether the user needs to adapt the technique used by the user so as to provide a sufficiently strong signal if that is what is intended, or a relatively weak signal if that is what is intended.

Figure 7:
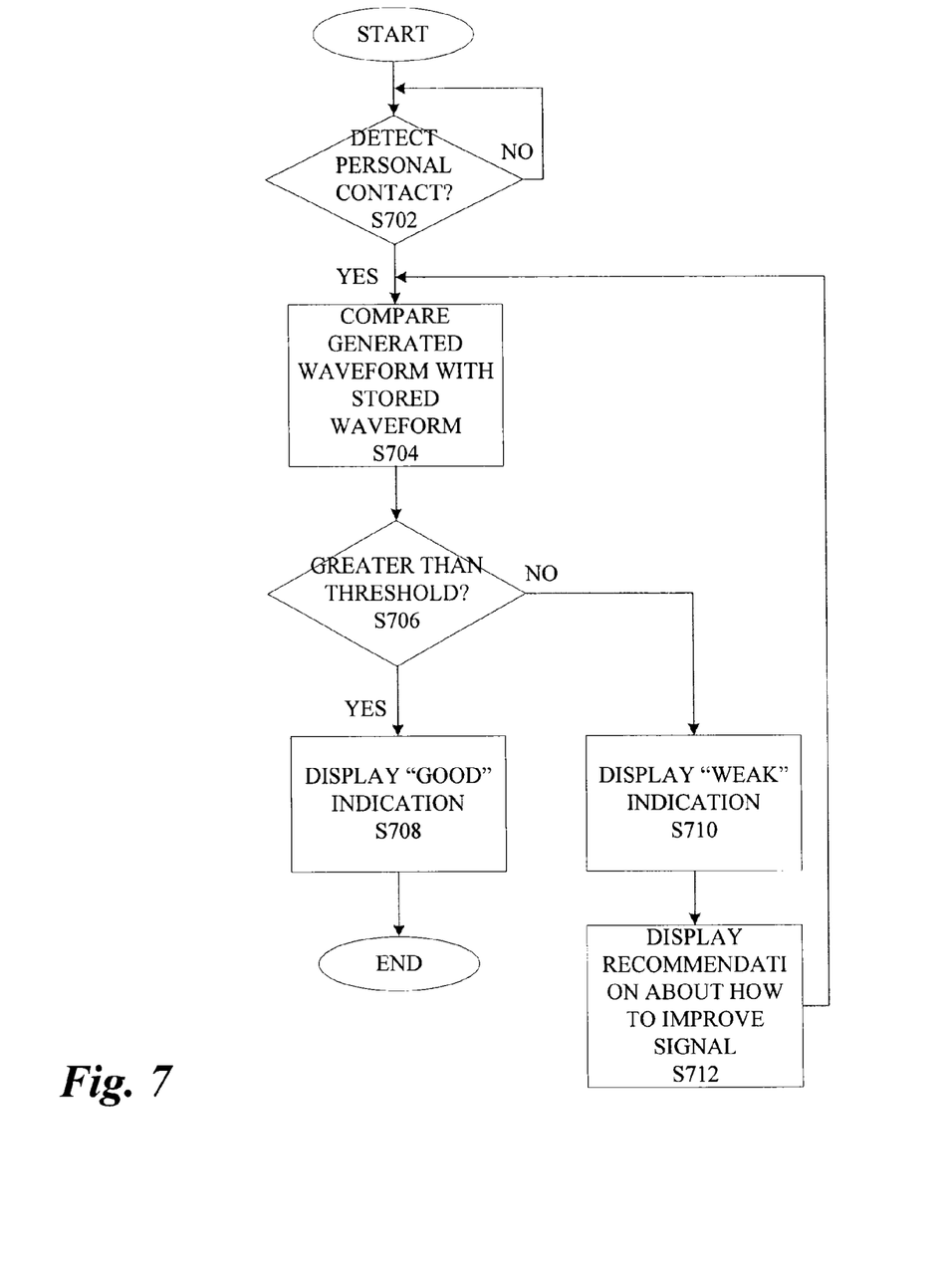
FIG. 7 is a flowchart illustrating how training feedback is provided to an operator from the smart device according to an embodiment.

FIG. 7 is a flowchart of a process for providing visual feedback to the user. The process begins in step S702, where a query is made regarding whether a personal contact has been detected. If the response is NO the process returns to the beginning of the step. However, if the response to the query in step S702 is affirmative, the process proceeds to step S704 where the generated waveform from the skin voltage is compared with the stored waveform. The process then proceeds to step S706, where the matching is compared with a predetermined threshold (e.g. correlation waveforms). If the response to the query at step S706 is negative, the process proceeds to step S710, where a "weak" indication is displayed. The process then proceeds to step S712 where a text or graphic representation (e.g. a video or an animation) is provided regarding how to improve the signal, such as rubbing for a longer period of time with a greater surface contact area. The process then proceeds back to step S704. However, if the query in step S706 is affirmative the process proceeds to step S708 where a "good" indication is provided to the user, as an indication of favorable feedback regarding the user's interaction with the diaphragm respiratory signal simulator. So as only the process ends.

Figure 8:
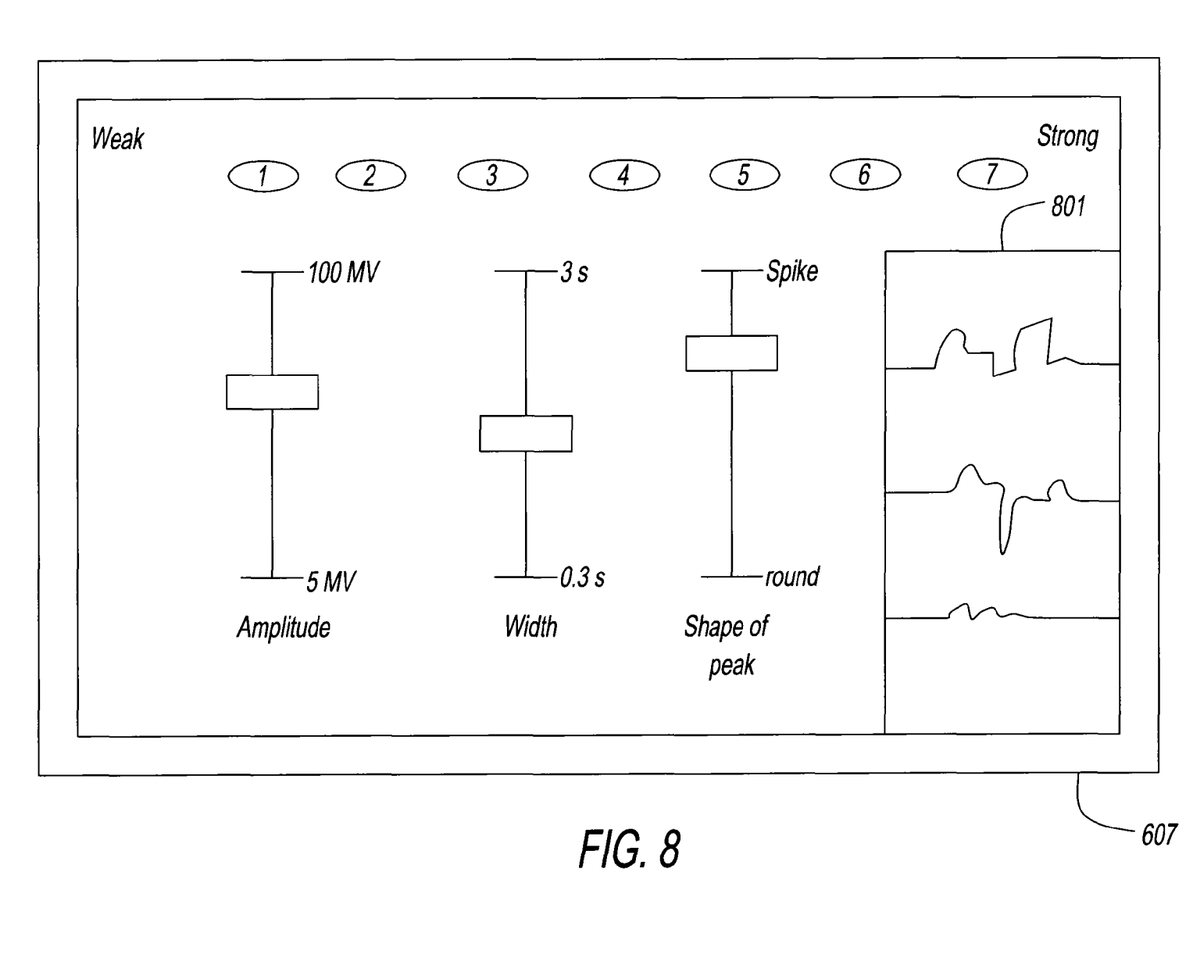
FIG. 8 is a schematic of a graphical user interface that includes an array of user-selectable simulated Edi signals according to an embodiment.

FIG. 8 shows a tablet computer 607 with a graphical user interface (touch panel) in which a user may select different pre-stored waveforms, and then adjust the amplitude, pulse width and peak shape of the waveforms to be provided to the manikin. For example, the application running on the tablet computer 607 has seven user-actuated buttons. When one of the buttons is selected, the tablet computer 607 retrieves from memory a stored waveform, that is a "weak" waveform. In this case, a weak waveform is one in which a patient condition has a weak electrical signal in his or her diaphragm and that is the condition to which to be simulated. On the other hand, if the user selects a stronger signal, then a different signal saved from memory will be retrieved and sent through an I/O to the diaphragm respiratory signal simulator, for exciting the ring electrode 308 (e.g. FIG. 3). So the user can observe the output waveform, a display portion 801 shows the waveform in an initial state, varied state and previous state. The user may also customize the output waveform by adjusting the amplitude, width and peak shape with slider bars shown. The amplitude may vary from 5 µV to 100 µV (as an example), the width (signal time) may vary between 0.3 and 3 sec, and the peak shape may vary from "round" meaning a greater percentage of the pulse energy is lies outside of a predetermined width about the peak than for a "spike" signal which is more rapid and concentrated about the peak.

Figure 9:
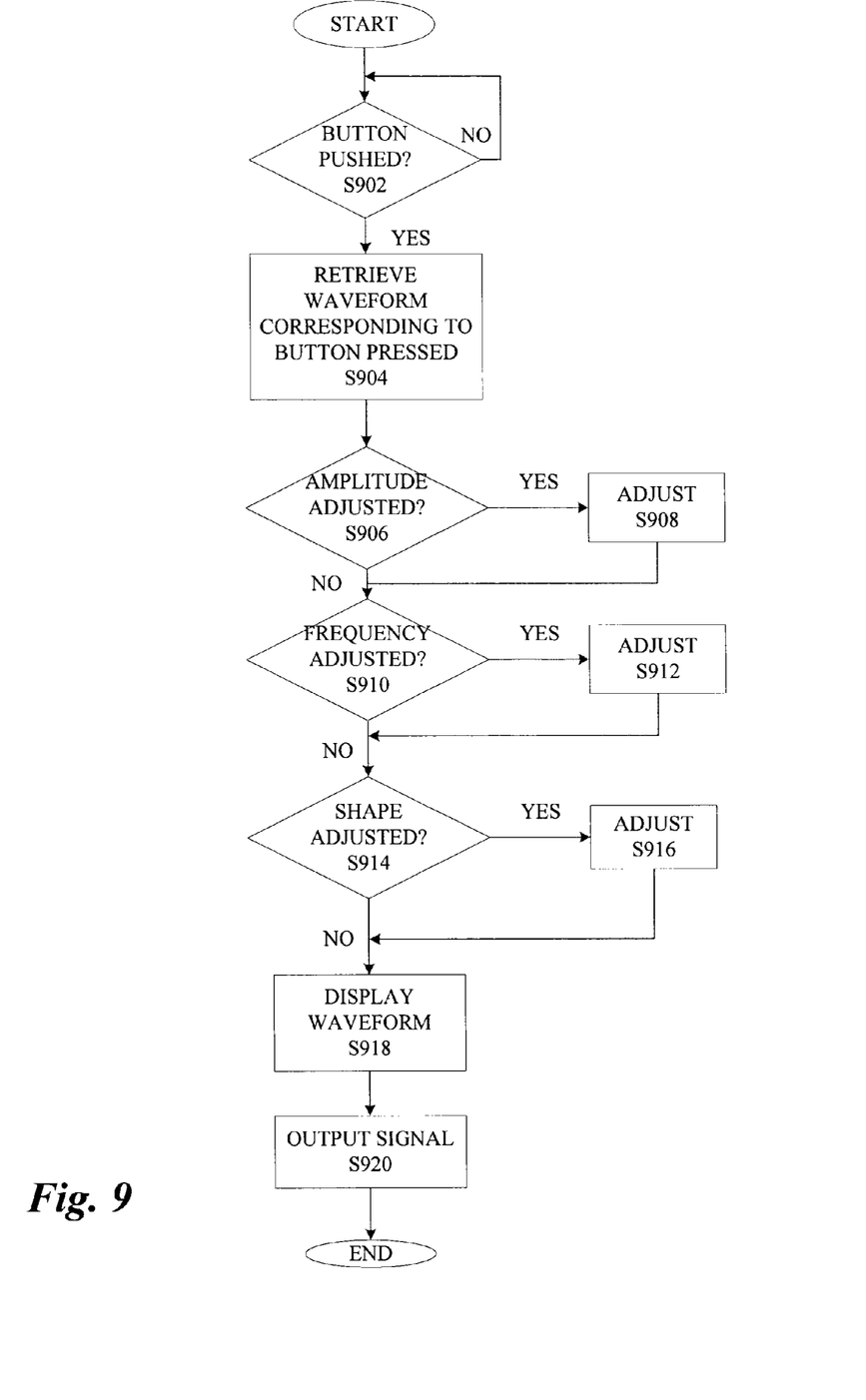
FIG. 9 is a flowchart illustrating a process of generating one of an array of user-selectable simulated Edi signals according to an embodiment.

FIG. 9 is a flowchart showing the process performed by the tablet computer 607 when executing the electrical signal generation application shown in FIG. 8. The process begins in step S902, where a query is made regarding whether one of the seven displayed buttons is pushed. If the response to the query in step S902 is negative the process returns to the beginning. However, if the response to the query in step S902 is affirmative the process proceeds to step S904 where a waveform is retrieved from memory that corresponds with the depressed button. The process then proceeds to the query in step S906 where it is determined whether the amplitude is adjusted. If the response to the query in step S906 is affirmative then the amplitude is adjusted in step S908. Subsequently, the process proceeds to step S910 where a query is made regarding the frequency (or width) being adjusted. If the response to the query in step S910 is affirmative then the frequency (or width) is adjusted in step S912. Subsequently, the process proceeds to the query in step S914 regarding whether the user has adjusted the shape. If the response to the query in step S914 is affirmative then the shape is adjusted in step S916 and then the process proceeds to step S918 where the resultant waveform is displayed before being output as an electrical signal in step S920. Subsequently, the process ends.

Figure 10:
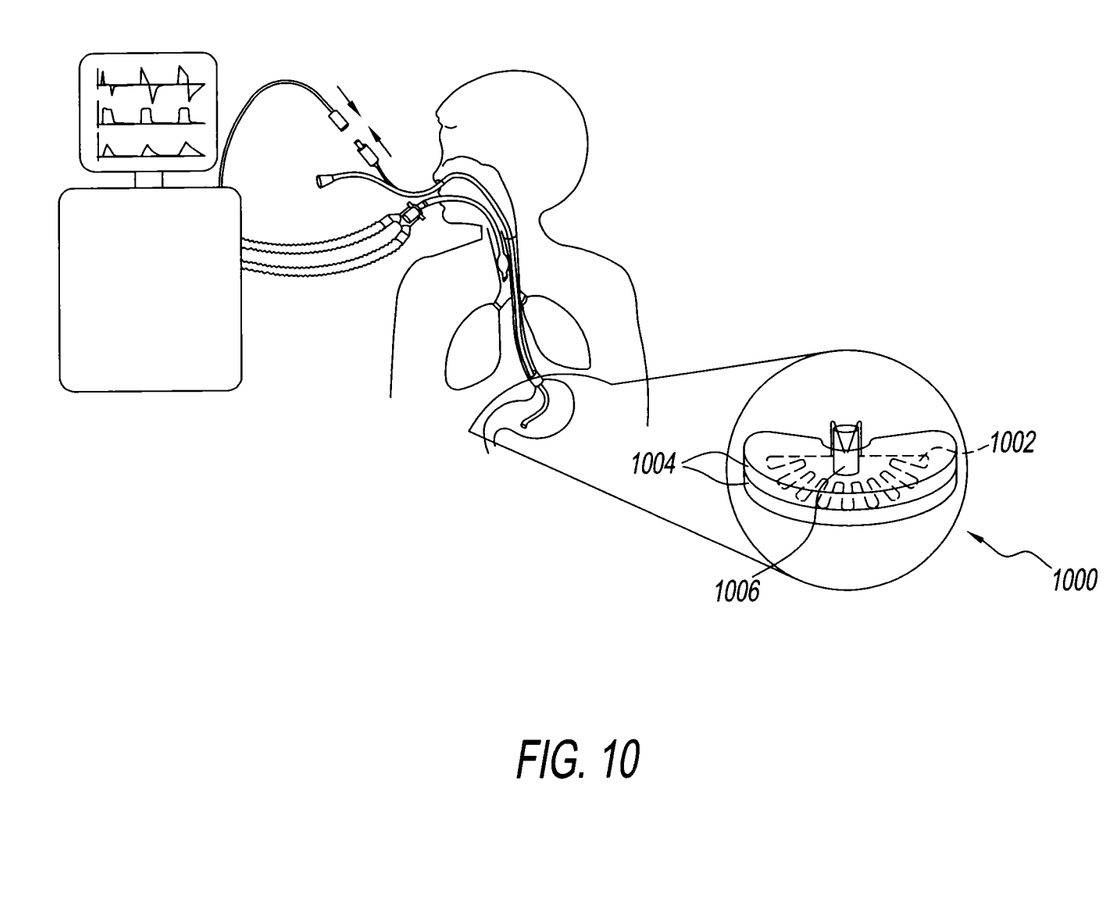
FIG. 10 is a schematic of an internal diaphragm respiratory signal simulator (Artificial diaphragm) according to an embodiment.

FIG. 10 is a schematic of an internal diaphragm respiratory signal simulator 1000 according to one example. The internal diaphragm respiratory signal simulator 1000 is designed to act as an "Artificial Diaphragm". The artificial diaphragm composes of a copper (or conductive) wire net (or mesh) 1002 that is fixed between two oval-shaped plastic layers that may be of different sizes ranging between 8-15 cm×15-35 cm×0.1-0.3 cm, but typically 12 cm×20 cm×0.2 cm.

This artificial diaphragm is directly connected to a ring electrode 306 and positioned at a diaphragm position in the manikin as would be understood by those skilled in the art. Triggering this embodiment to generate an electrical signal does not involve any direct contact with the artificial diaphragm, instead a triggering action for this embodiment may be a fingertip slide onto the manikin's body (for example shoulder/chest exposed or covered with man-made tissue fabric) and/or sliding a fingertip on any metal and/or plastic surfaces that are within a nearby region of the manikin, or touching/sliding the finger on the ventilator screen. Moreover, the coupling of voltage from the user to the simulator 1000 is via proximity interaction and not direct contact. In this case the signal simulator 1000 is a proximity transducer that couples the skin voltage to the signal simulator 1000 via capacitive coupling or induction.

In another embodiment, the artificial diaphragm includes a transceiver that may wireless send and receive signals that are detected by an external computer/server. This way a user may be able to activate the device through communicating using the external computer/server to transmit signals to the transceiver. This feature adds to the convenience of using the device, as the user may design through the computer a desired electrical signal to be sent to the internal device and activate it without the need of the user's presence in the same room. This will allow medical professionals to monitor multiple training sessions simultaneously as well as controlling different training scenarios depending on the signal being sent to the chips inside the manikin's. This embodiment provides a possibility of a practical quiz/test as the professor may very well test the reaction and knowledge of trainees based on different signals with different parameters.

Figure 11:
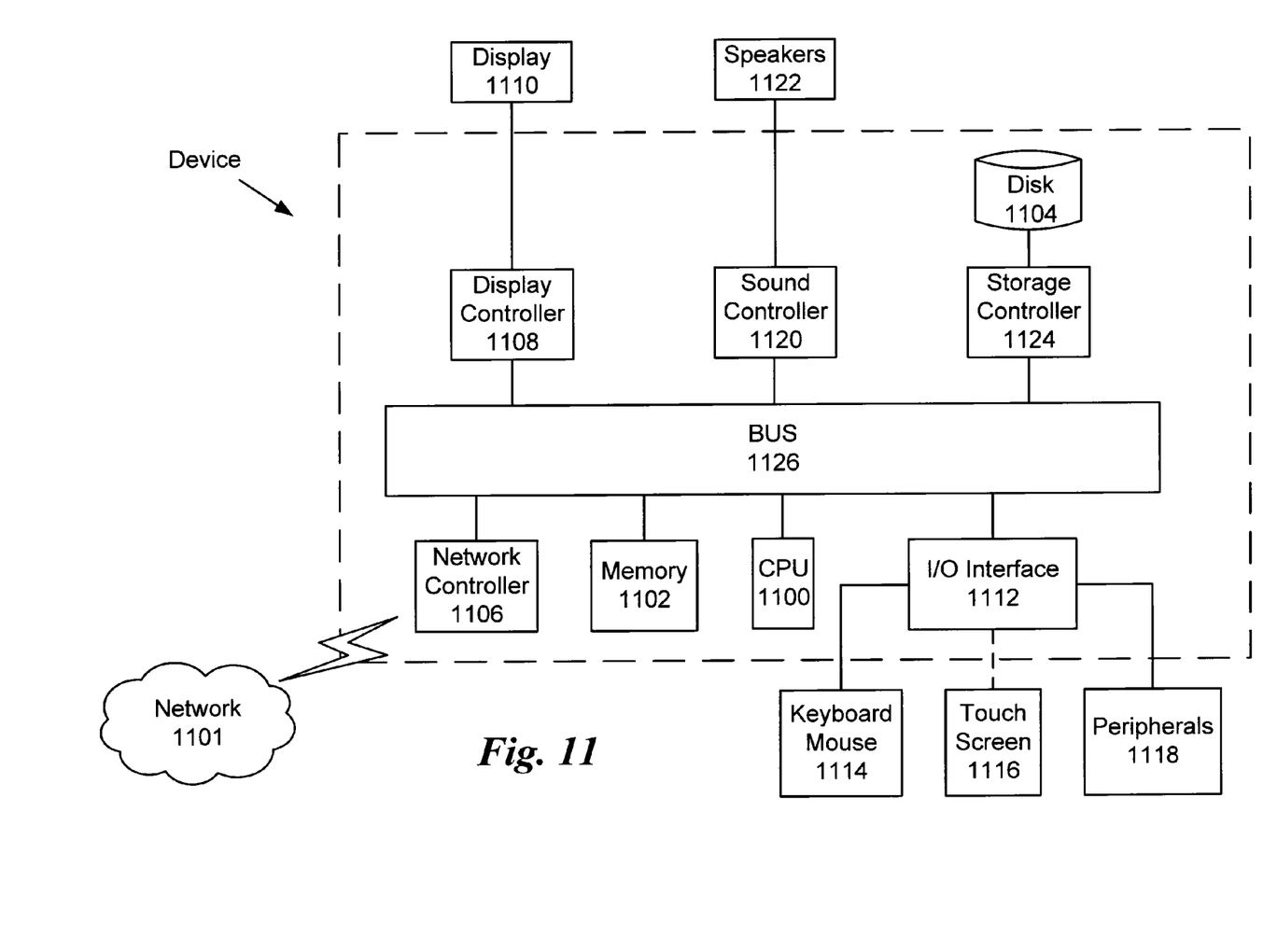
FIG. 11 is a schematic illustrating an exemplary hardware configuration of a smart device according to one example.

Next, a hardware description of the diaphragm respiratory signal simulator according to exemplary embodiments is described with reference to FIG. 11. In FIG. 11, the diaphragm respiratory signal simulator includes a CPU 1100 which performs the processes described above. The process data and instructions may be stored in memory 1102. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the diaphragm respiratory signal simulator communicates, such as a server or computer.

Further, the claimed advancements may be provided as a utility application, background daemon, or component of an operating system, or combination thereof, executing in conjunction with CPU 1100 and an operating system such as Microsoft Windows 7, UNIX, Solaris, LINUX, Apple MAC-OS and other systems known to those skilled in the art.

CPU 1100 may be a Xenon or Core processor from Intel of America or an Opteron processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The diaphragm respiratory signal simulator in FIG. 11 also includes a network controller 1106, such as an Intel Ethernet PRO network interface card from Intel Corporation of America, for interfacing with network 1101. As can be appreciated, the network 1101 can be a public network, such as the Internet, or a private network such as an LAN or WAN network, or any combination thereof and can also include PSTN or ISDN sub-networks. The network 1101 can also be wired, such as an Ethernet network, or can be wireless such as a cellular network including EDGE, 3G and 4G wireless cellular systems. The wireless network can also be WiFi, Bluetooth, or any other wireless form of communication that is known.

The diaphragm respiratory signal simulator further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the diaphragm respiratory signal simulator, such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the diaphragm respiratory signal simulator. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

The invention claimed is:

1. An electrically passive device for simulating an Edi signal detected by a sensor array mounted on a catheter disposed in an esophagus of a manikin to trigger supported breath in NAVA mode of ventilation, comprising:
a signal actuator configured to couple a skin voltage of an operator based on an operator's moving contact on the signal actuator and generates a simulated Edi signal;

a conductor that couples the simulated Edi signal from the signal actuator outside the manikin to inside the manikin; and a ring electrode coupled to the conductor and positioned inside the manikin so as to receive there-through the catheter that hosts the sensor array and collects-the simulated AEdi signal which in turn triggers supported breath in the NAVA mode.

2. The device according to claim 1, further comprising: at least one conductive plate that couples the conductor to the ring electrode.

3. The device according to claim 1, wherein the signal actuator includes a conductive plate disposed on a dielectric body.

4. The device according to claim 3, wherein the conductive plate has a roughness of between 200 and 1000 grit.

5. The device according to claim 1, wherein the signal actuator comprises a conductive wire or a conductive mesh sandwiched between a plastic film and a dielectric substrate.

6. The device according to claim 5, wherein the signal actuator comprising the conductive wire, and the wire is arranged in a sinuous pattern with a pitch between 0.05" to 1".

7. An electrically passive device for simulating an Edi signal detected by sensor array mounted on a catheter disposed in an esophagus of a manikin to trigger supported breath in NAVA mode of ventilation, comprising:

an internal diaphragm respiratory signal simulator configured to couple a skin voltage of an operator based on an operator's movement in proximity to, but not in contact with, the internal diaphragm respiratory signal simulator so as to generate a simulated Edi signal on the internal diaphragm respiratory signal simulator, the internal diaphragm respiratory signal simulator including a conductive wire net sandwiched between two plastic layers, wherein the simulated Edi signal is generated on the conductive wire net, and a ring electrode electrically and directly connected to the conductor and positioned inside the manikin so as to receive there-through the catheter that hosts the sensor array and collects-the simulated Edi signal which in turn triggers supported breath in the NAVA mode.

8. The device of claim 7, wherein
the two plastic plates are oval shaped.

9. The device of claim 7, wherein
the device has a thickness between 0.1 to 0.3 cm.

10. The device of claim 7, wherein
a longest axis of the device is between 15 cm and 35 cm.

11. The device of claim 7, wherein
the ring electrode is conductive and is has a cylindrical shape.

12. A device for simulating an Edi signal detected by a sensor array mounted on a catheter disposed in an esophagus of a manikin to trigger supported breath in NAVA mode of ventilation, comprising:

a ring electrode positioned inside the manikin so as to receive there-through the catheter that hosts the sensor array and collects a simulated Edi signal which in turn triggers supported breath in the NAVA mode;

a signal actuator configured to convey the simulated Edi signal to the ring electrode, said signal actuator having an external interface; and a computer having processing circuitry, a display and a signal interface, the signal interface being configured to transmit the simulated Edi signal to the external interface of the signal actuator, said computer being programmed to provide a graphical user interface on the display that includes a plurality of user selectable icons that each represent a different Edi signal waveform stored in memory, detect a user selection of one of the user selectable icons and retrieve a stored Edi signal as the simulated Edi signal in response to the user selection, and provide the simulated Edi signal to the external interface of the signal actuator.

13. The device of claim 12, wherein the computer is a tablet computer, and the display is a touch panel.

14. The device of claim 12, wherein
the signal actuator is configured to generate the simulated Edi signal by coupling a skin voltage of an operator based on an operator's moving contact on the signal actuator, and the computer is programmed to detect the simulated Edi signal and provide a display indication of a strength of the simulated Edi as visual feedback to the operator.

15. The device of claim 14, wherein the display indication a weak indication or a strong indication.

16. The device of claim 14, wherein the display includes a visual display of the simulated AEdi signal.

17. The device of claim 14, wherein the computer is programmed to correlate the simulated Edi with a stored Edi signal to determine if the simulated signal is weak signal or a strong signal.

18. The device of claim 12, wherein the computer is further programmed to include on the graphical user interface user-customizable signal controls.

19. The device of claim 18, wherein the user-customizable signal controls includes an amplitude signal control.

20. The device of claim 18, wherein the user-customizable signal controls include a pulse width signal control and a peak shape signal control.

* * * * *

UNITED STATES PATENT AND TRADEMARK OFFICE
CERTIFICATE OF CORRECTION

PATENT NO. : 9,460,639 B2
APPLICATION NO. : 14/482813
DATED : October 4, 2016
INVENTOR(S) : Ahmed Abdelkarim Mansi Page 1 of 1

It is certified that error appears in the above-identified patent and that said Letters Patent is hereby corrected as shown below:

On the Title Page

Item (30), the Foreign Application Priority Data has been omitted. Item (30) should read:
-- (30) Foreign Application Priority Data
Sep. 15, 2013   (GB)..........................1316385.2 --

Signed and Sealed this
Twenty-seventh Day of March, 2018

Andrei Iancu
*Director of the United States Patent and Trademark Office*